(12) United States Patent
Huang

(10) Patent No.: US 10,005,402 B2
(45) Date of Patent: Jun. 26, 2018

(54) LOAD-ASSISTING CARGO BRACKET FOR VEHICLES

(71) Applicant: Bestrident Ltd., Pushin Township, Changhua County (TW)

(72) Inventor: Hsueh Li Huang, Hsinchu (TW)

(73) Assignee: BESTRIDENT LTD., Pushin Township, Changhua County (TW)

( * ) Notice: Subject to any disclaimer, the term of this patent is extended or adjusted under 35 U.S.C. 154(b) by 153 days.

(21) Appl. No.: 15/287,651

(22) Filed: Oct. 6, 2016

(65) Prior Publication Data
US 2018/0099618 A1 Apr. 12, 2018

(51) Int. Cl.
| B60R 9/042 | (2006.01) |
| B60R 9/045 | (2006.01) |
| B60R 9/08 | (2006.01) |
| B60P 3/40 | (2006.01) |

(52) U.S. Cl.
CPC ............... B60R 9/042 (2013.01); B60R 9/08 (2013.01); *B60P 3/40* (2013.01); *B60R 9/045* (2013.01)

(58) Field of Classification Search
CPC . B60R 9/042; B60R 9/045; B60R 9/08; B60P 3/40
USPC ......... 224/310, 405; 414/462; D12/406, 412
See application file for complete search history.

(56) References Cited

U.S. PATENT DOCUMENTS

| | | | | |
|---|---|---|---|---|
| 2,712,470 A | * | 7/1955 | Cardini | B60R 9/06 224/405 |
| 2,859,887 A | * | 11/1958 | Haight | B60R 9/042 193/42 |
| 4,475,760 A | * | 10/1984 | Morgan | B62D 33/08 248/430 |
| 4,630,990 A | * | 12/1986 | Whiting | B60R 9/042 224/310 |
| 5,690,259 A | * | 11/1997 | Montani | B60R 9/042 224/310 |
| 6,015,074 A | * | 1/2000 | Snavely | B60R 9/042 224/310 |
| D422,553 S | * | 4/2000 | VonDuyke | D12/412 |
| D435,510 S | * | 12/2000 | Quidort | D12/412 |
| 6,338,427 B1 | * | 1/2002 | Aftanas | B60R 9/042 224/309 |
| 6,425,508 B1 | * | 7/2002 | Cole | B60R 9/045 224/320 |
| 6,427,888 B1 | * | 8/2002 | Condon | B60R 9/042 224/310 |
| D470,451 S | * | 2/2003 | Bushart | D12/412 |

(Continued)

*Primary Examiner* — Justin Larson
(74) *Attorney, Agent, or Firm* — Cheng-Ju Chiang

(57) ABSTRACT

A load-assisting cargo bracket for vehicles comprises a main body and an assisting assembly. The main body comprises a bottom, a side rail frame disposed around the bottom, and an accommodating space defined beside the bottom. The assisting assembly comprises a first rod and two second rods. One end of each of the two second rods is connected with the first rod, and the other end of the each second rod is received within a corresponding branch rail of the side rail frame. The each second rod is aligned with the corresponding branch rail of the side rail frame. The first rod is spaced from a back and a top of a vehicle when the two second rods extend out of the side rail frame, and is positioned next to the bottom of the main body when the each second rod is entirely received within the side rail frame.

18 Claims, 10 Drawing Sheets

(56) References Cited

U.S. PATENT DOCUMENTS

| | | | |
|---|---|---|---|
| 6,598,922 B2 * | 7/2003 | Morse | B60P 3/40 |
| | | | 296/26.02 |
| 6,715,652 B2 * | 4/2004 | Kmita | B60R 9/042 |
| | | | 224/310 |
| 7,036,698 B2 | 5/2006 | Allen | |
| D537,404 S * | 2/2007 | Bauer | D12/412 |
| 8,028,874 B2 * | 10/2011 | Stiles | B60P 3/1075 |
| | | | 193/37 |
| 8,245,893 B2 | 8/2012 | Sautter et al. | |
| 8,733,604 B2 | 5/2014 | Murray et al. | |
| 8,864,001 B2 * | 10/2014 | Langseder | B60R 5/041 |
| | | | 224/405 |
| 8,998,047 B2 * | 4/2015 | DeMers | B60R 9/042 |
| | | | 224/310 |
| 9,457,728 B2 * | 10/2016 | Murray | B60R 9/08 |
| 2003/0052145 A1 * | 3/2003 | Aftanas | B60R 9/042 |
| | | | 224/310 |
| 2004/0188478 A1 * | 9/2004 | Williams | B60R 9/042 |
| | | | 224/310 |
| 2006/0182544 A1 * | 8/2006 | Hurst, Sr. | B60R 9/042 |
| | | | 414/222.13 |
| 2007/0090139 A1 * | 4/2007 | McKenzie | B60R 3/005 |
| | | | 224/310 |
| 2011/0024472 A1 * | 2/2011 | Thompson | B60R 9/042 |
| | | | 224/500 |
| 2013/0306694 A1 * | 11/2013 | Langseder | B60R 5/041 |
| | | | 224/403 |

* cited by examiner

LOAD-ASSISTING CARGO BRACKET FOR VEHICLES

BACKGROUND OF THE INVENTION

1. Field of the Invention

The present invention relates to a load-assisting cargo bracket for vehicles. Particularly, a load-assisting cargo bracket for vehicles is capable of providing full and reliable protection to the vehicles from undesired damage while any cargo is loaded above any one of the vehicles.

2. The Related Arts

Usually large sized cargos are considered to be delivered or moved by using a proper sized truck having an enough containing space. However, using a top space above vehicles is a reasonable choice when no proper truck is available and delivery or moving of large sized cargos is required to finish in a short time. Conventionally, a frame or a bracket for cargo loading is used and is disposed on crossbars above vehicles. With help of the additional frame or bracket, the top space above vehicles is able to be freely used when an inner space of vehicles, particularly an ordinary private car such as a sport utility vehicle (SUV), is not enough for loading of large sized cargos.

Unfortunately, the conventional cargo loading frame or bracket is usually selected for installation due to having a similar size to a top of a vehicle. An oversized cargo loading frame or bracket is obviously a dangerous factor for driving safety of vehicles. As a result, loading of any large sized cargo, such as a kayak, becomes a very difficult work to be completed. Particularly, at least one side of the large sized cargo, like a stem of the kayak, is at first lifted to be placed onto the frame or bracket disposed above the vehicle. The large sized cargo is then pushed to move along the frame or bracket until the entire large sized cargo is located above the frame or bracket. During pushing of the large sized cargo, particularly the kayak, any unbalance of the pushed large sized cargo may lead to undesired falling of the large sized cargo, and further lead to possible impact or damage on the vehicle due to the restricted size of the frame or bracket as previously discussed.

An extension from the frame or bracket is designed conventionally to solve the above mentioned problem. The extension can be an extra part attached to the frame or bracket to extend away from the frame or bracket, or a movable frame or bracket which is movable above the top of the vehicle. The extension of the frame or bracket is able to extend reach of the frame or bracket above the vehicle so that the lifted part of the large sized cargo can be at first lifted and placed on the extension which extends away from the vehicle by a safe distance. The large sized cargo is then pushed to move and be placed from the extension to the frame or bracket. However, the extension of the conventional frame or bracket is only designed to provide a safer lifted-and-placed location which is apparently away from the vehicle by the safe distance. No additional protection is provided during pushing of the large sized cargo to move and be placed from the extension to the frame or bracket. In other words, any unbalance during pushing of the large sized cargo may still result in falling of the large sized cargo and undesired impact on the vehicle when no particular safe design is provided between the extension and the frame or bracket to prevent further falling of the large sized cargo off the vehicle. In other words, without any particularly designed safe mechanism for the extension, the vehicle is still at risk of being impacted and damaged during loading of the large sized cargo.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENT

Figure 1:
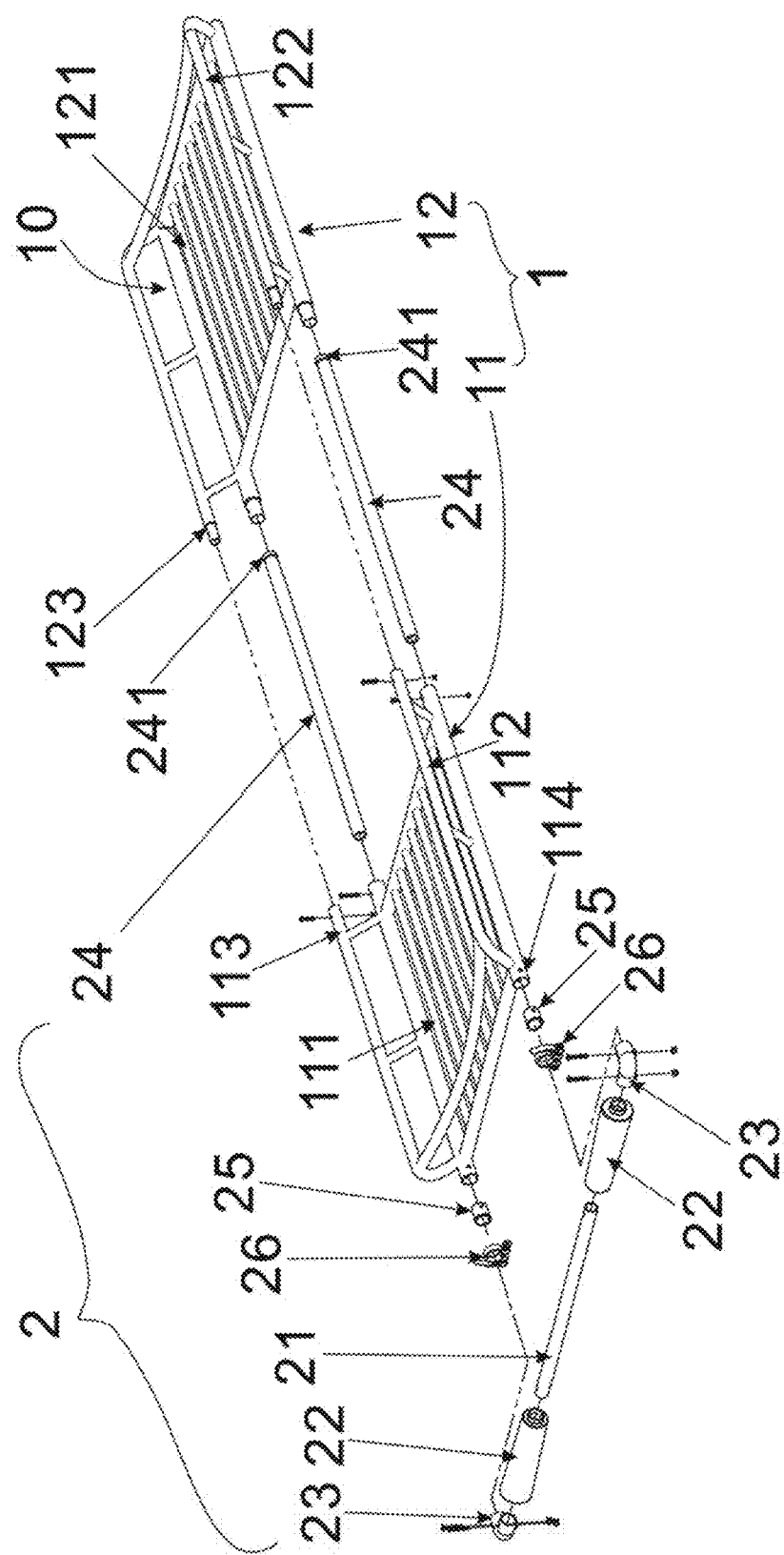
FIG. 1 shows a schematic exploded perspective view of a load-assisting cargo bracket for vehicles in accordance with a preferred embodiment of the present invention.
Figure 2:
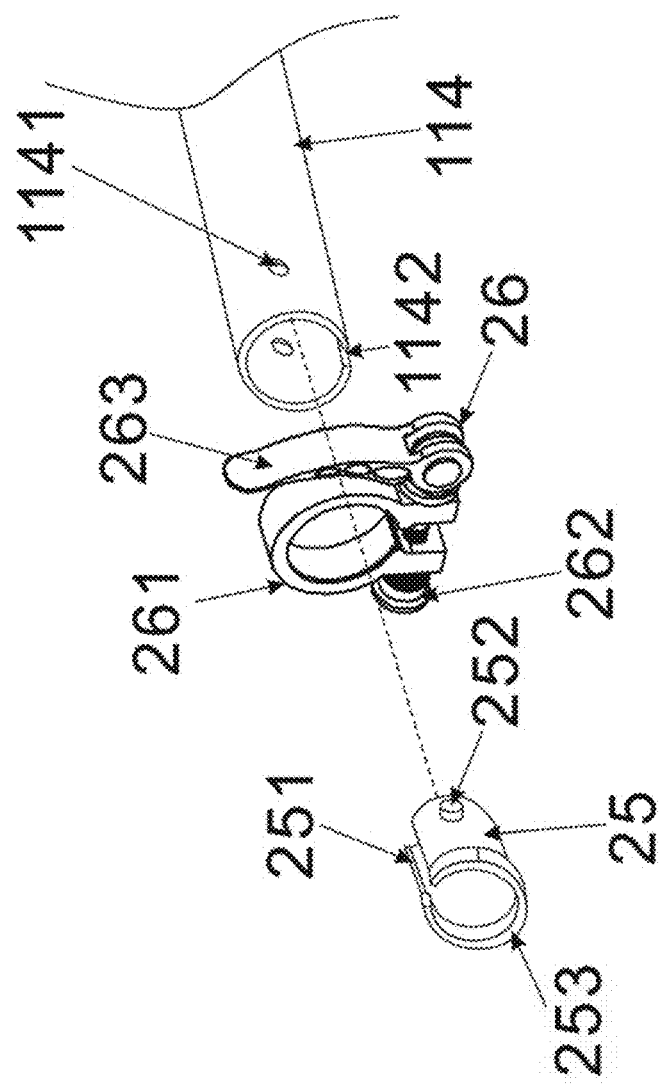
FIG. 2 shows a schematic partially enlarged perspective view of a fixing piece and a fastener installed at a third connection end of the load-assisting cargo bracket for vehicles in accordance with a preferred embodiment of the present invention.
Figure 3:
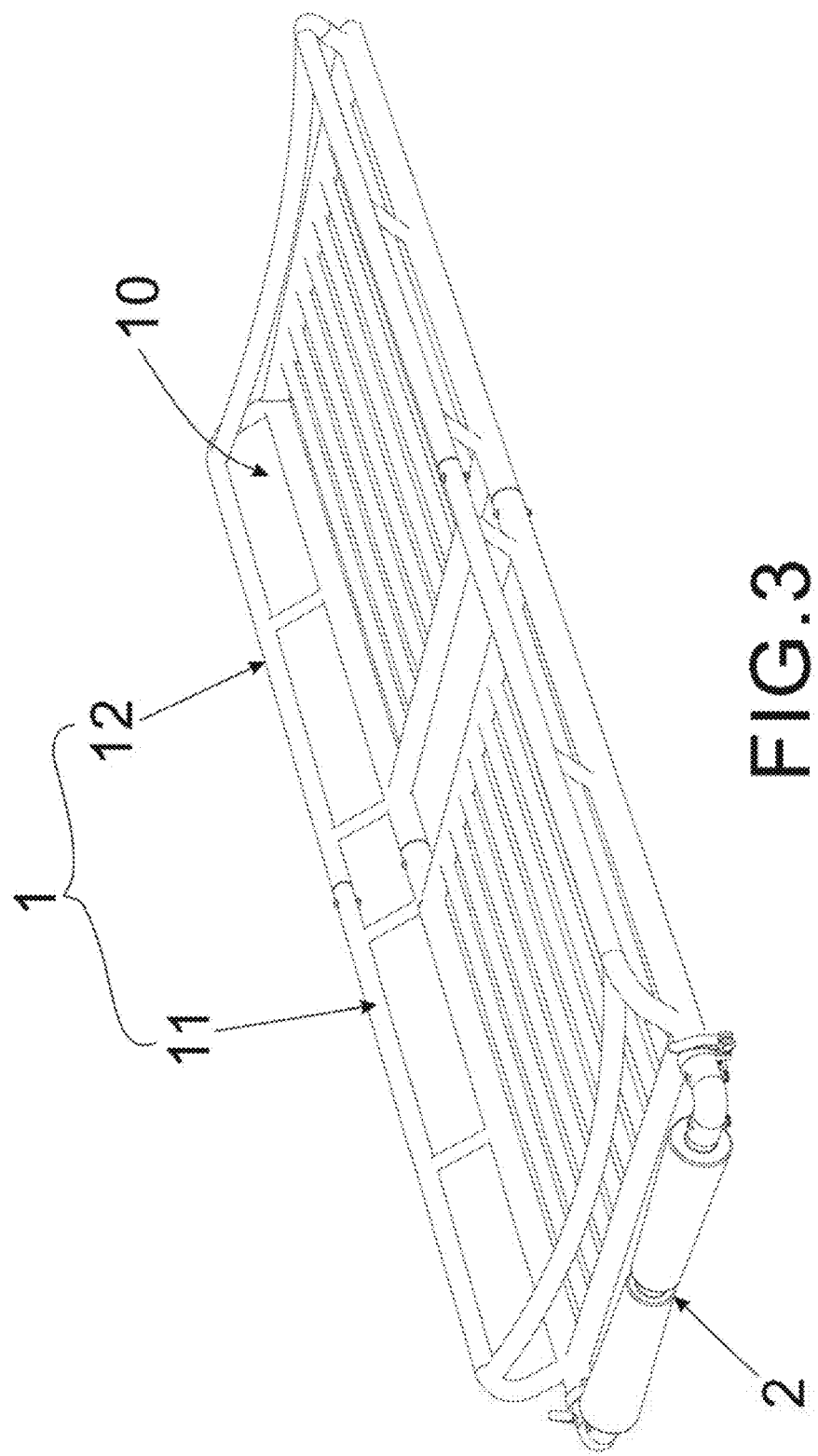
FIG. 3 shows a schematic assembled perspective view of the load-assisting cargo bracket for vehicles as shown in FIG. 1 in accordance with a preferred embodiment of the present invention.
Figure 4:
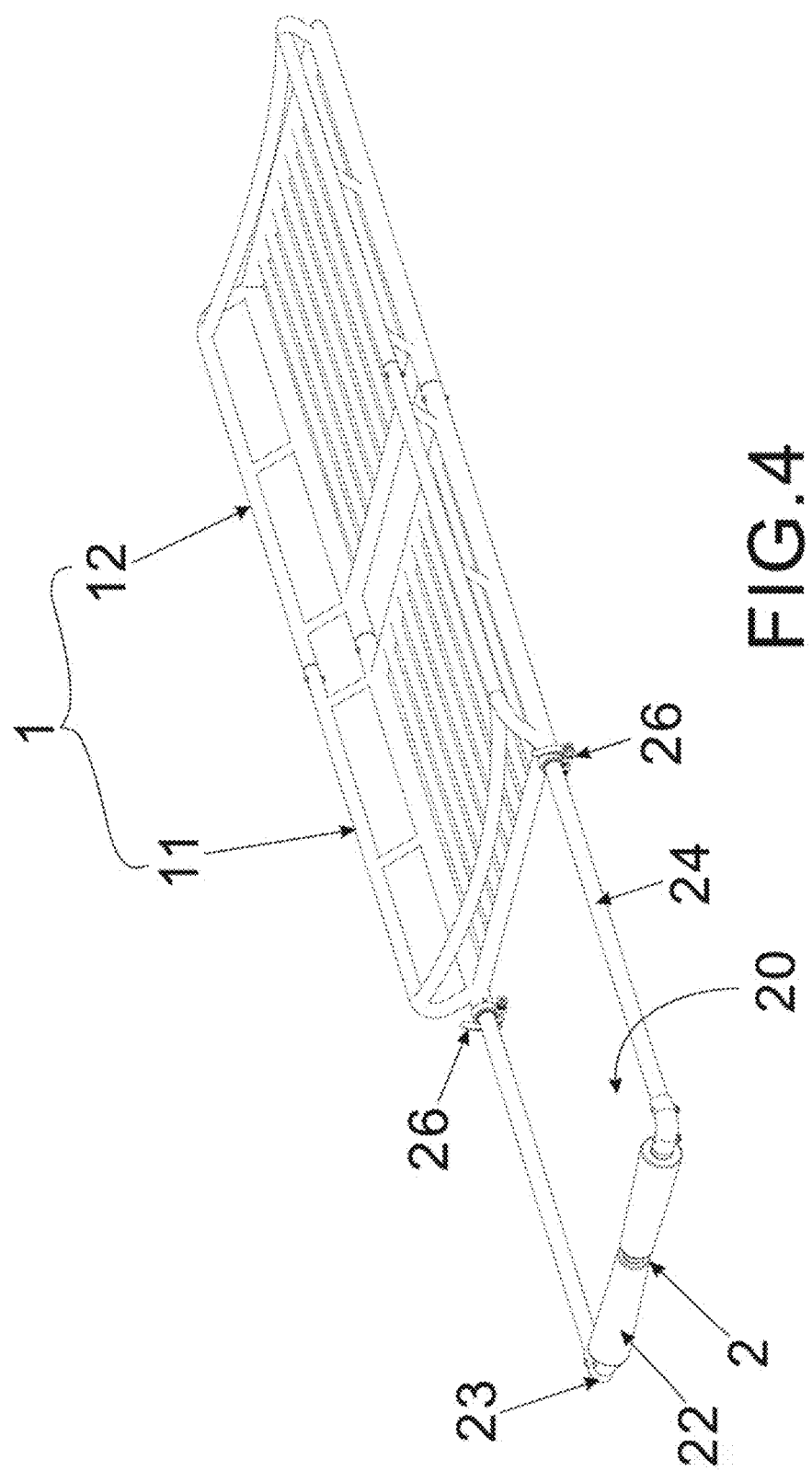
FIG. 4 shows a schematic assembled perspective view of the load-assisting cargo bracket for vehicles as shown in FIG. 1 with an assisting assembly thereof fully extending out in accordance with a preferred embodiment of the present invention.
Figure 5:
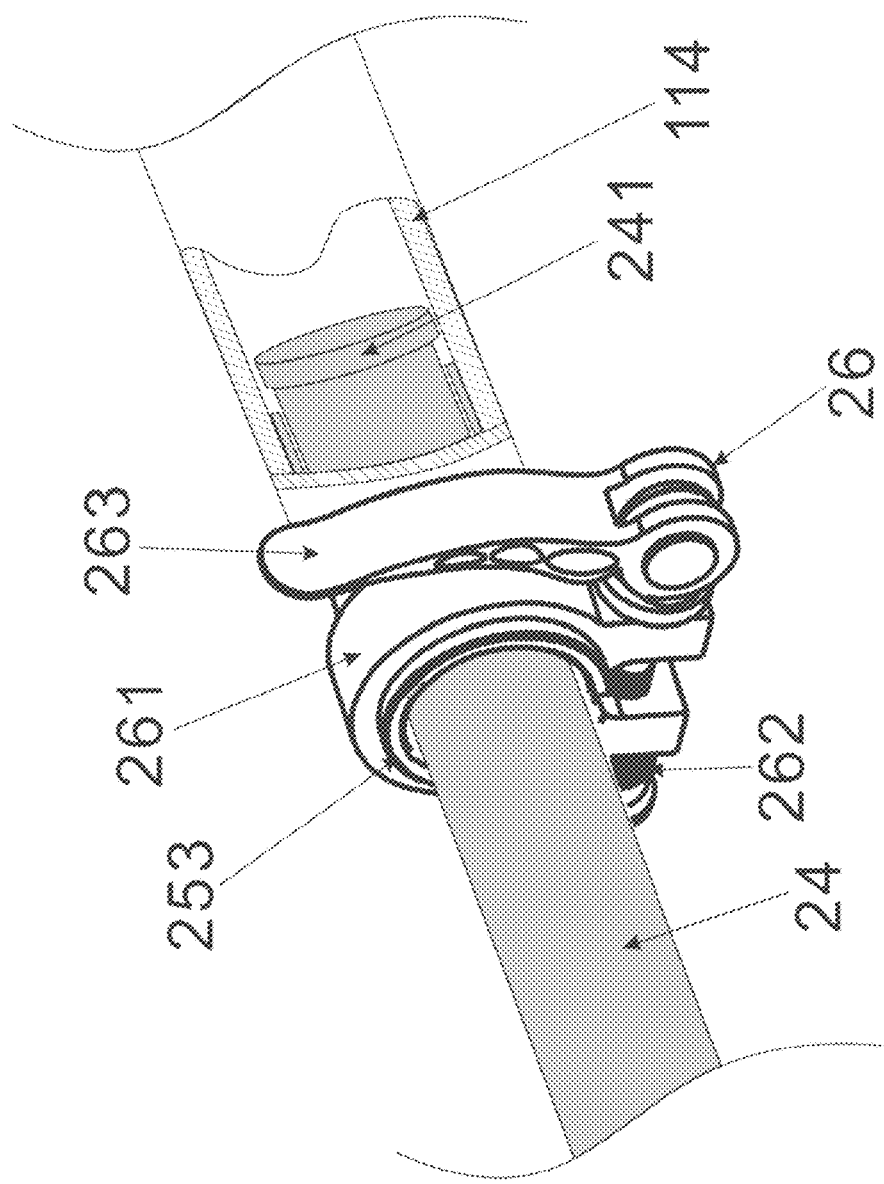
FIG. 5 shows a schematic partially enlarged perspective view of a second rod of the assisting assembly moving in the third connection end of the load-assisting cargo bracket for vehicles in accordance with a preferred embodiment of the present invention.

With reference to FIGS. 1-3 and FIG. 8, a load-assisting cargo bracket for vehicles in accordance with a preferred embodiment of the present invention comprises a main body 1, an assisting assembly 2 and at least one fixing part 3. The main body 1 of the load-assisting cargo bracket for vehicles is a bracket shaped body and is defined an accommodating space 10 with an opening set beside the accommodating space 10 and facing away from a vehicle 5 when the load-assisting cargo bracket is installed above the vehicle 5. The main body 1 comprises a first bracket body 11 and a second bracket body 12. Each of the first and second bracket bodies 11, 12 comprises a bottom comprising a plurality of rails 111, 121, a side rail frame 112, 122 surrounding at least three sides of the accommodating space 10. At an adjacent side of the first bracket body 11 to the second bracket body 12, four first connection ends 113 are formed and extend respectively from two corners of the bottom of the first bracket body 11 and two distal ends of the side rail frame 112. Correspondingly, four second connection ends 123 are formed at an adjacent side of the second bracket body 12 to the first bracket body 11, and extend respectively from two corners of the bottom of the second bracket body 12 and two distal ends of the side rail frame 122. With each of the second connection ends 123 snugly engaged within a corresponding one of the first connection ends 113 and fixed together by a screw, the first bracket body 11 and the second bracket body 12 are assembled as the main body 1, and the accommodating space 10 are surrounded by the main body 1 from at least three sides of the accommodating space 10 while the rest side of the accommodating space 10 is occupied by the opening. Two third connection ends 114 are formed at the other two corners of the bottom of the first bracket body 11 which are located far away from the second bracket body 12. Each of the two third connection ends 114 comprises two holes 1141 formed at two opposing side walls of the each third connection end 114, and a notch 1142 formed at a distal end of the each third connection end 114 and extending from an edge of the distal end of the each third connection end 114 along a direction away from the edge of the distal end of the each connection end 114.

With reference to FIGS. 1-5, the assisting assembly 2 comprises a first rod 21, two rolling parts 22, two corner pieces 23, two second rods 24, two fixing pieces 25 and two fasteners 26. The first rod 21 is inserted into each of the two rolling parts 22 correspondingly from each end of the first rod 21. As a result, the each of the two rolling parts 22 is able to roll around the first rod 21 to provide convenience of loading any cargo onto and above the load-assisting cargo bracket. Each of the two corner pieces 23 is a curved right-angled shape, and one end of the each corner piece 23 is assembled at the each end of the first rod 21 and fixed thereon by a screw. The other end of the each corner piece 23 is assembled correspondingly at one end of each of the two second rods 24 and fixed thereon by a screw. A blocker 241 in a shape of a knob is formed at the other end of the each second rod 24. The first rod 21 and the two second rods 24, assembled by the two corner pieces 23, are set to surround and form a closed void 20 after the other end of the each second rod 24 having the blocker 241 is sequentially inserted into one branch rail of the side rail frame 112 located at one of two opposite sides of the bottom of the first bracket body 11, and further movably inserted into one branch rail of the side rail frame 122 located at one of two opposite sides of the bottom of the second bracket body 12. Each of the two fixing pieces 25 is ring shaped with a slit 251 formed at a side thereof and extending along a longitudinal direction of the each fixing piece 25 to incise the each fixing piece 25. At least one protrusion 252 is formed at an outer surface of the each fixing piece 25. A flange 253 is formed at a distal edge of the each fixing piece 25. Each of the two fasteners 26 is installed at a corresponding one of the two third connection ends 114 with help of a corresponding one of the two fixing pieces 25. Each of the two fasteners 26 comprises a ring body 261 with a gap formed at a side of the ring body 261, a bolt 262 having two bump ends and penetrating through two sides of the gap of the ring body 261, and a handle 263 disposed and connected at one of the two bump ends of the bolt 262 and being movable to at least two positions. In a first position of the at least two positions of the handle 263, the bolt 262 is controlled by a cam of the handle 263 to move toward the handle 263, and therefore to narrow a size of the gap of the ring body 261. In a second position of the at least two positions of the handle 263, the bolt 262 is controlled by the cam of the handle 263 and resilience of the ring body 261 to move away from the handle 263, and therefore to enlarge the size of the gap of the ring body 261. The each fixing piece 25 is inserted through the ring body 261 of the each fastener 26 so that the flange 253 of the each fixing piece 25 is able to engage against the ring body 261 of the each fastener 26, and is further inserted into a corresponding one of the two third connection ends 114 via shape changing of the slit 251 of the each fixing piece 25 and the notch 1142 of the corresponding one of the two third connection ends 114 to facilitate the at least one protrusion 252 engaging in one of the holes 1141 of the corresponding one of the two third connection ends 114. As a result, the each fastener 26 is able to be installed at the distal end of the corresponding one of the two third connection ends 114 between the flange 253 of the each fixing piece 25 and the at least one protrusion 252 of the each fixing piece 25.

Figure 6:
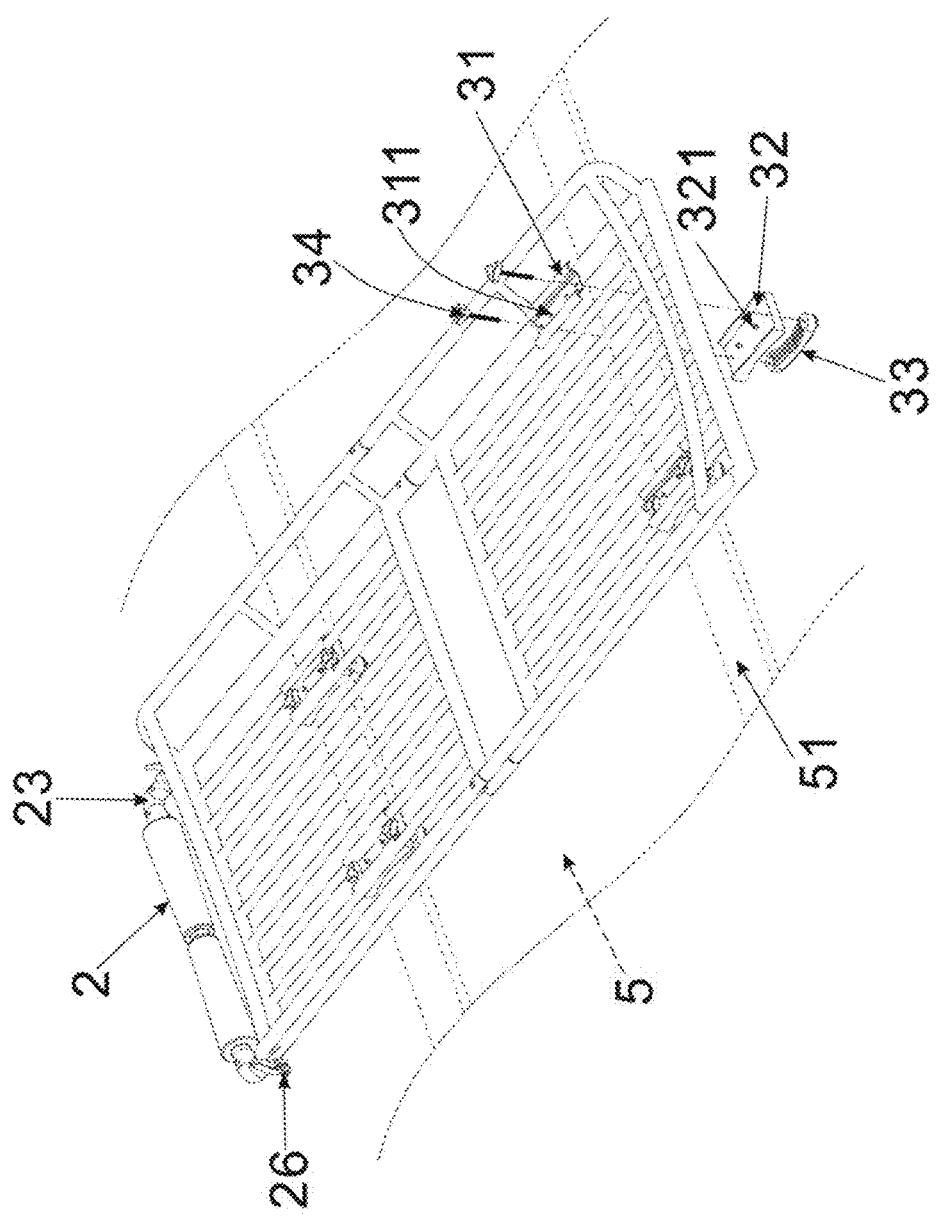
FIG. 6 shows a schematic assembled perspective view of the load-assisting cargo bracket for vehicles as shown in FIG. 1 fixed at a top of a vehicle with one of fixing parts thereof fully exploded by partially showing the top of the vehicle in accordance with a preferred embodiment of the present invention.
Figure 7:
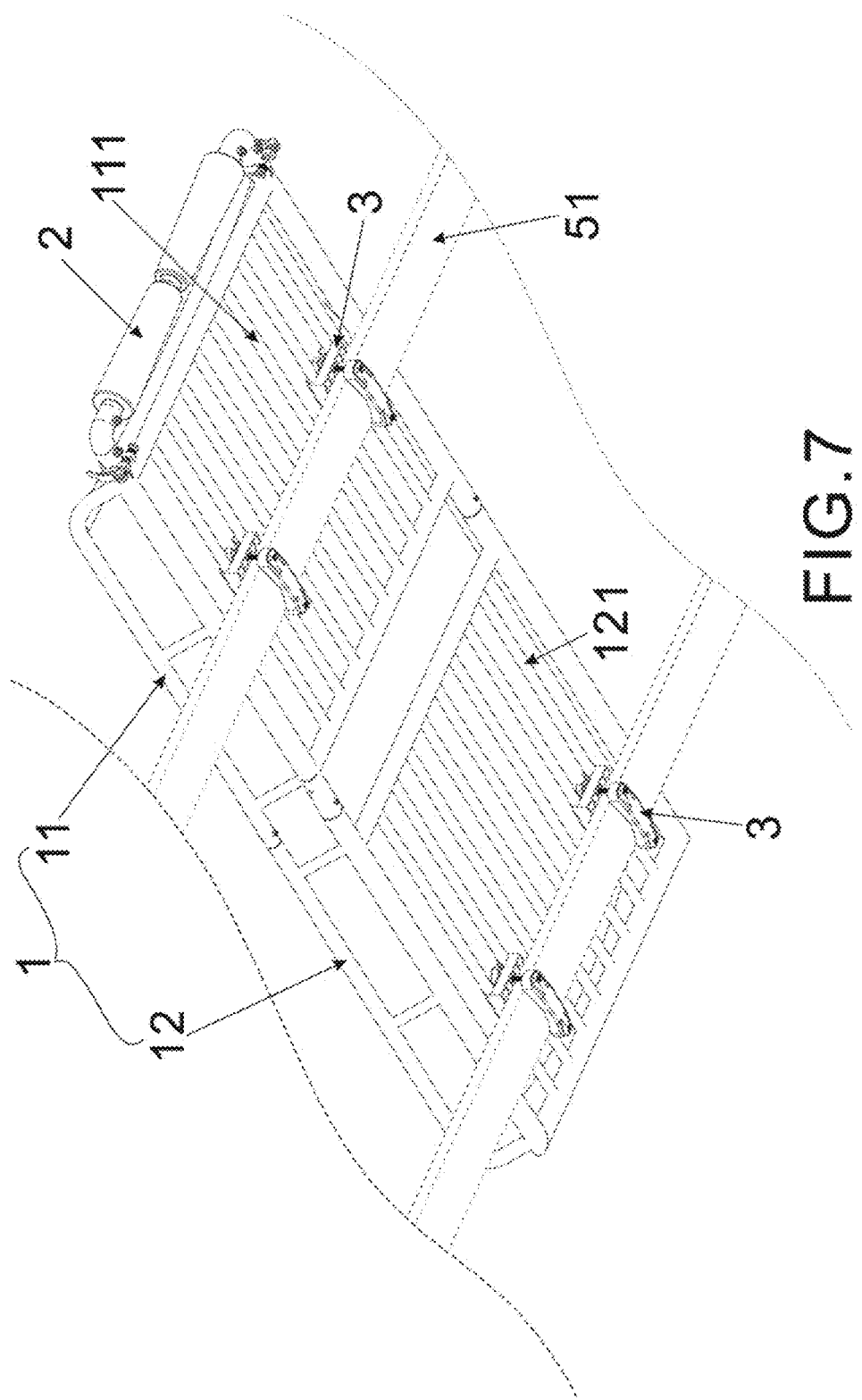
FIG. 7 shows a schematic assembled perspective view of the load-assisting cargo bracket for vehicles as shown in FIG. 6 fixed at the top of the vehicle viewed from another viewing angle in accordance with a preferred embodiment of the present invention.
Figure 8:
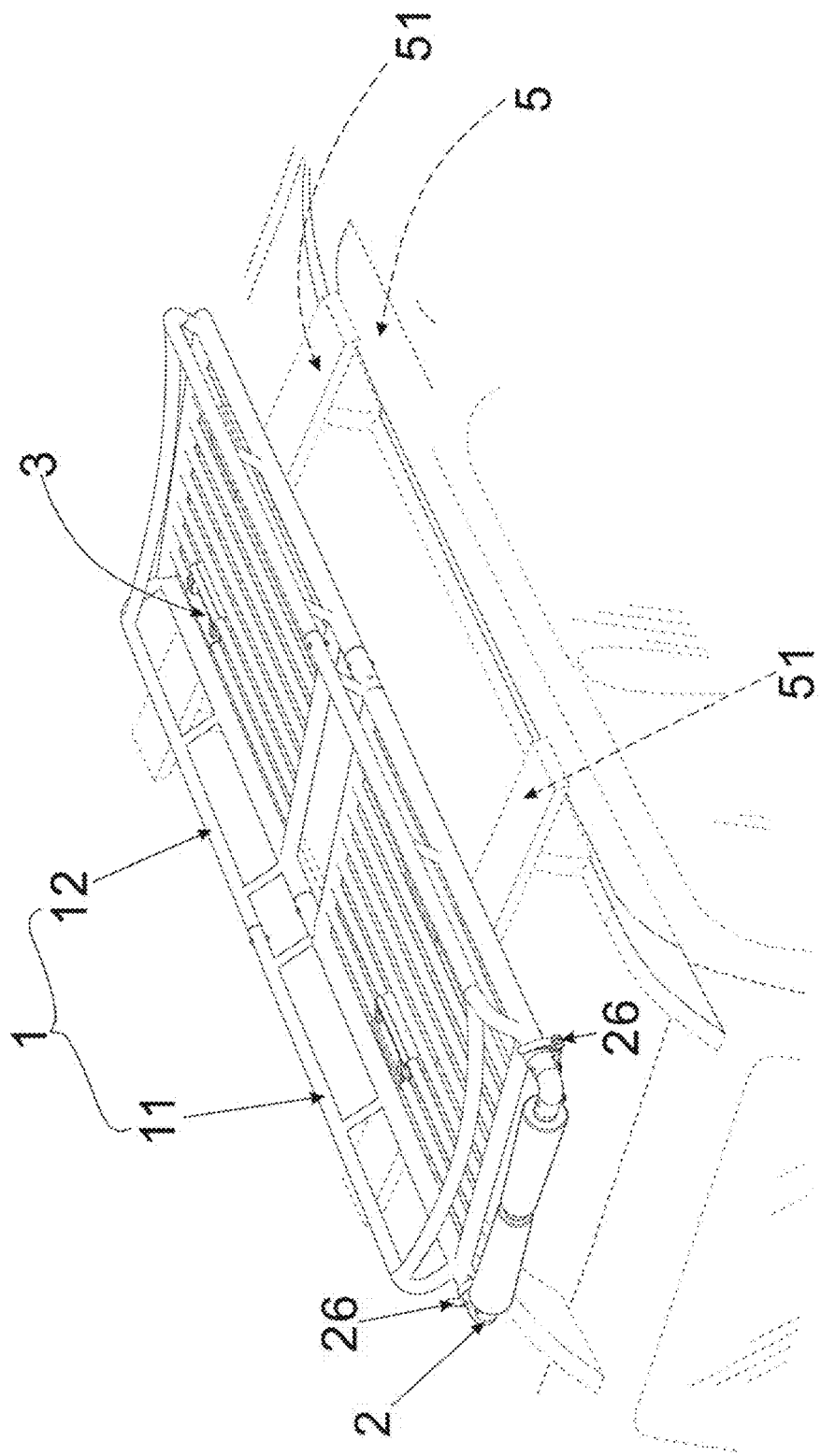
FIG. 8 shows a schematic assembled perspective view of the load-assisting cargo bracket for vehicles as shown in FIG. 6 fixed at the top of the vehicle by showing at least an upper half of the vehicle in accordance with a preferred embodiment of the present invention.

With reference to FIG. 6, FIG. 7 and FIG. 8, the load-assisting cargo bracket for vehicles in accordance with the present invention is installed on crossbars 51 of a vehicle rack set above a top of a vehicle 5 via the at least one fixing part 3. Each of the at least one fixing part 3 of the load-assisting cargo bracket for vehicles comprises a first piece 31, a second piece 32 and a third piece 33. The first piece 31 is set to stride above at least two rails 111 of the bottom of the first bracket body 11 or at least two rails 121 of the bottom of the first bracket body 12 while the second piece 32 is set to stride beneath the at least two rails 111, 121. At least one projection 321 is formed at a side of the second piece 32 engaged against the at least two rails 111, 121. At least one aperture 311 is correspondingly formed at the first piece 31. Hence, when the first piece 31 is placed at a preset location of the at least two rails 111, 121 for installation, the second piece 32 is able to easily engage against the at least two rails 111, 121 at the same preset location of the at least two rails 111, 121 to sandwich the at least two rails 111, 121 between the first piece 31 and the second piece 32 by matching and insertion of each of the at least one projection 321 in a corresponding one of the at least one aperture 311. The second piece 32 is located between the at least two rails 111, 121 and a corresponding crossbar 51 of the vehicle rack of the vehicle 5 when the load-assisting cargo bracket for vehicles is installed above the top of the vehicle 5. The third piece 33 is then placed below the second piece 32 and the corresponding crossbar 51 at the same preset location of the at least two rails 111, 121 in order to sandwich the corresponding crossbar 51 between the second piece 32 and the third piece 33. At least two screws 34 are used to screw and fix the first, second and third pieces 31, 32, 33 together at two opposite sides of the at least one aperture 311 of the first piece 31 in order to complete installation of the load-assisting cargo bracket for vehicles above the top of the vehicle 5.

Figure 9:
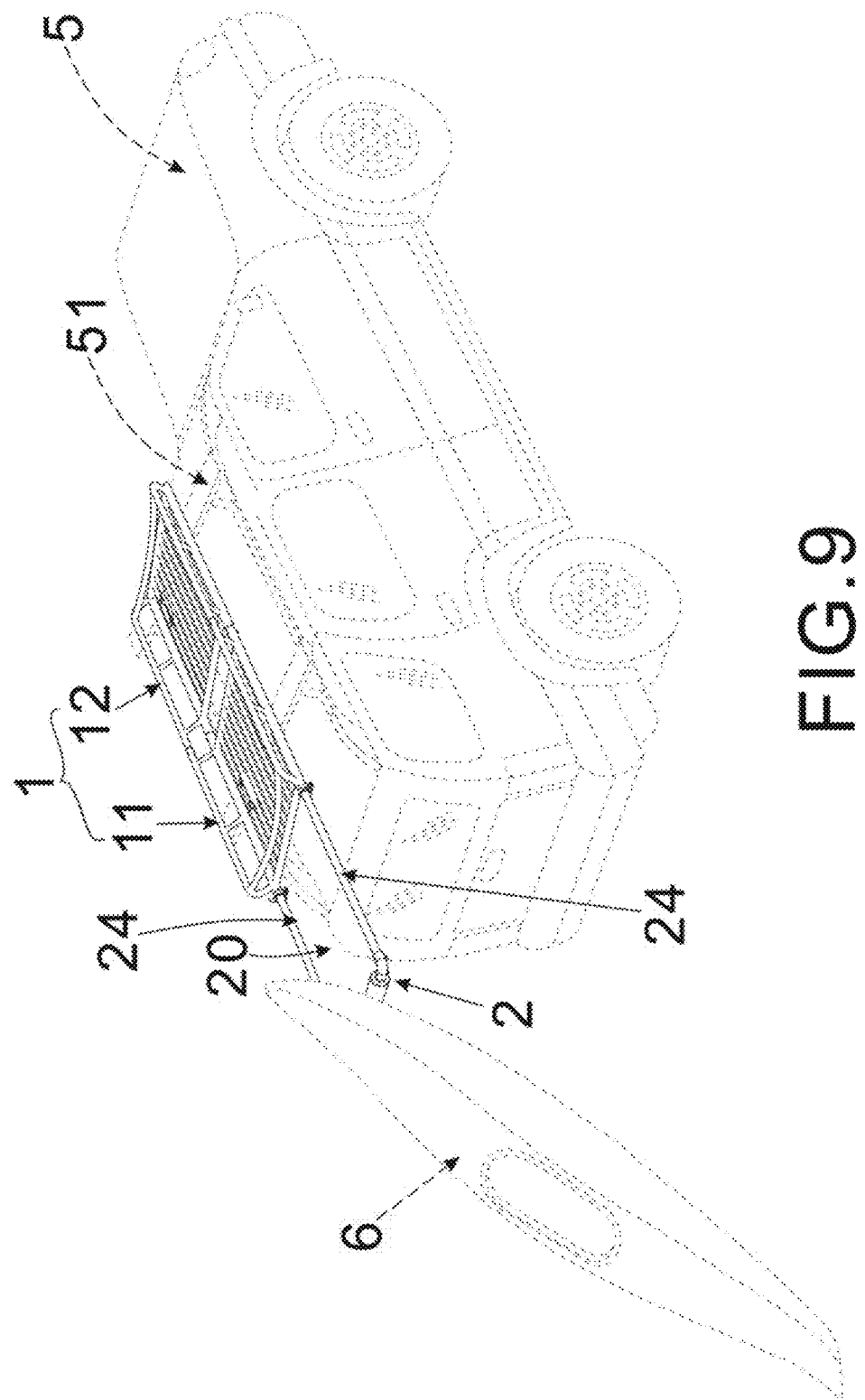
FIG. 9 shows a schematic perspective view of the load-assisting cargo bracket for vehicles in accordance with a preferred embodiment of the present invention with the assisting assembly being in a full extension thereof and a kayak being about to be loaded.
Figure 10:
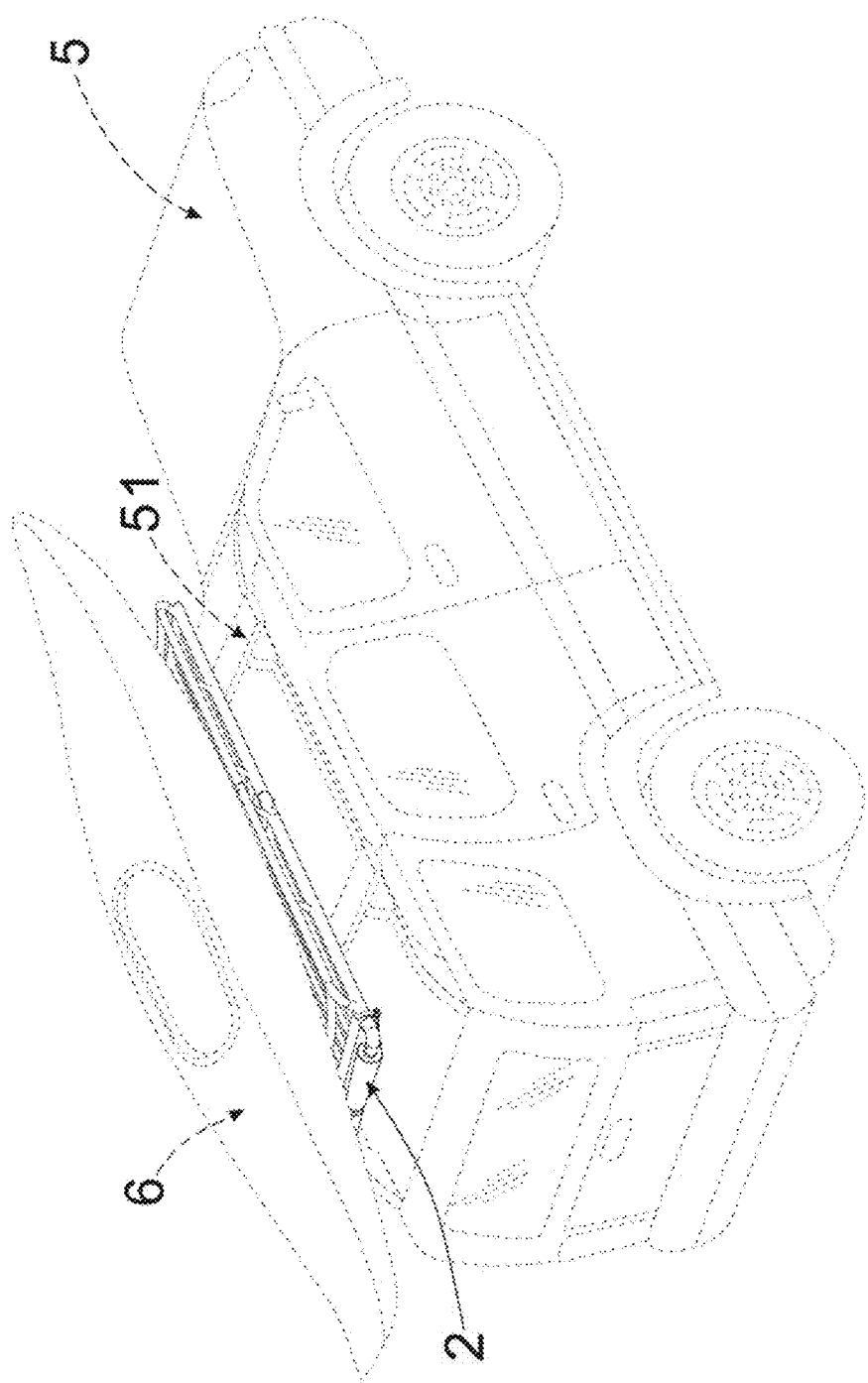
FIG. 10 shows a schematic perspective view of the load-assisting cargo bracket for vehicles in accordance with a preferred embodiment of the present invention after the kayak is completely loaded above the vehicle and the assisting assembly is retracted back in position.

With reference to FIG. 9 and FIG. 10, when a cargo, such as a kayak 6, is about to be loaded onto the load-assisting cargo bracket for vehicles in accordance with the present invention, the assisting assembly 2 is completely pulled out of the main body 1 in its full extension at first, and is positioned and fixed by the two fastener 26 so that no further movement of the assisting assembly 2 relative to the main body 1 is allowed. The full extension of the assisting assembly 2 is decided when the blocker 241 of the each second rod 24 of the assisting assembly 2 is pulled to move and then engage against the corresponding one of the two fixing pieces 25 since an outer surface diameter of the blocker 241 is larger than an inner surface diameter of the corresponding one of the two fixing pieces 25 (See details in FIG. 5). Since the first rod 21 with the two rolling parts 22 of the assisting assembly 2 is apparently spaced away from a back and the top of the vehicle 5 after the assisting assembly 2, loading of the cargo, i.e., the kayak 6, is considerably safe and is able to avoid any accidental impact on the vehicle 5. Besides, the closed void 20 formed between the first rod 21, the two second rods 24 and the first rail frame 112 of the first bracket body 11 is used to temporarily accommodate an advanced front section of the kayak 6 therein by loading and placing the advanced front section of the kayak 6 between the first rod 21 and the first rail frame 112 of the first bracket body 11. The kayak 6 is then pushed forward to be completely loaded in the accommodating space 10 of the main body 1 of the load-assisting cargo bracket for vehicles. The assisting assembly 2 is then pushed and retracted back in the main body 1 by placing the first rod 21 adjacent the side rail frame 112 of the first bracket body 11 after complete loading of the kayak 6. During loading of the kayak 6, the closed void 20 is used for temporarily resting of any part of the kayak 6 for labor saving. When any part of the kayak 6 is rested in the closed void 20, the rested part of the kayak 6 is able to penetrate through the closed void 20 and to be located at both sides of an imaginary plane where the closed void 20 is located. Meanwhile, the each second rod 24 is designed to be aligned with the corresponding one branch rail of the side rail frame 112 in order to prevent any unexpected falling of the kayak 6 to impact the vehicle 5 since a safe distance from impacts on the vehicle 5 is defined by enough spacing between the two second rods 24. In a preferred embodiment of the present invention, the spacing between the two second rods 24 is defined same as a width of the bottom of the first bracket body 11 and a width of the bottom of the second bracket body 12.

Although only the preferred embodiments of the present invention are described as above, the practicing claim scope of the present invention is not limited to the disclosed embodiments. It is understood that any simple equivalent changes, adjustments or modifications to the present invention based on the following claims of the present invention and the content of the above invention description may be still covered within the claimed scope of the following claims of the present invention.

What is claimed is:

1. A load-assisting cargo bracket for vehicles, comprising:
    a main body disposed on a top of a vehicle, and comprising a bottom, a side rail frame disposed around the bottom, and an accommodating space defined beside the bottom to be opened away from the vehicle, and surrounded by the side rail frame and the bottom; and
    an assisting assembly comprising a first rod and two second rods, one end of each of the two second rods connected with a corresponding end of the first rod, the other end of the each of the two second rods received within a corresponding branch rail of the side rail frame located at a corresponding one of two opposite sides of the bottom, and movable in the corresponding branch rail of the side rail frame, a closed void defined together and surrounded by the first rod, the two second rods and a side of the side rail frame, the each of the two second rods being aligned with the corresponding branch rail of the side rail frame where the other end of the each of the two second rods is movably received therein;
    wherein the first rod of the assisting assembly is spaced from a back and the top of the vehicle when the each of the two second rods extends out of the corresponding branch rail of the side rail frame in a preset extending extent thereof, and is positioned next to the bottom of the main body when the each of the two second rods is entirely received within the corresponding branch rail of the side rail frame; and
    wherein a cargo is able to be temporarily loaded in the closed void defined together by the first rod, the two second rods and the side of the side rail frame before being further loaded in the accommodating space of the main body when the first rod of the assisting assembly is positioned and spaced from the back and the top of the vehicle.

2. The load-assisting cargo bracket for vehicles as claimed in claim 1, wherein the main body comprises a first bracket body and a second bracket body, a plurality of first connection ends are formed at an adjacent side of the first bracket body to the second bracket body, a plurality of second connection ends are formed at an adjacent side of the second bracket body to the first bracket body, the first bracket body is connected with the second bracket body to form the main body via fixed engagement between each of the plurality of first connection ends and a corresponding one of the plurality of second connection ends.

3. The load-assisting cargo bracket for vehicles as claimed in claim 2, wherein the bottom of the main body comprises a bottom formed in the first bracket body and a bottom formed in the second bracket body, the corresponding branch rail of the side rail frame extends along one of two opposite sides of the bottom of the first bracket body and one of two opposite sides of the bottom of the second bracket body, respectively.

4. The load-assisting cargo bracket for vehicles as claimed in claim 1, wherein the assisting assembly comprises two corner pieces, each of the two corner pieces is installed at a corresponding end of two opposite ends of the first rod, and is used to connect to a corresponding one of the two second rods.

5. The load-assisting cargo bracket for vehicles as claimed in claim 1, wherein the assisting assembly comprises at least two rolling parts, the first rod is inserted through each of the at least two rolling parts so that the each of the at least two rolling parts is able to roll around the first rod to provide convenience of loading the cargo.

6. The load-assisting cargo bracket for vehicles as claimed in claim 1, wherein the bottom of the main body comprises a plurality of rails, at least one fixing part is disposed at the bottom of the main body to stride on at least two of the plurality of rails so as to fix the main body on the top of the vehicle.

7. The load-assisting cargo bracket for vehicles as claimed in claim 1, wherein a third connection end is formed at a distal end of the corresponding branch rail of the side rail frame, a fastener is disposed at the third connection end, and is used to fix the each of the two second rods to the corresponding branch rail of the side rail frame.

8. The load-assisting cargo bracket for vehicles as claimed in claim 7, wherein a fixing piece is used to fix and assemble the fastener to the third connection end.

9. The load-assisting cargo bracket for vehicles as claimed in claim 8, wherein a blocker is formed at a distal end of the each of two second rods away from the first rod, an outer surface diameter of the blocker is larger than an inner surface diameter of the fixing piece so that the each of two second rods is blocked by the fixing piece when the each of two second rods moves to extend out of the corresponding branch rail of the side rail frame.

10. A load-assisting cargo bracket for vehicles, comprising:
- a main body disposed on a top of a vehicle, and comprising a bottom, a side rail frame disposed around the bottom, and an accommodating space defined beside the bottom to be opened away from the vehicle, and surrounded by the side rail frame and the bottom; and
- an assisting assembly comprising a first rod and two second rods, one end of each of the two second rods connected with a corresponding end of the first rod, the other end of the each of the two second rods received within the side rail frame and movable therein, a closed void defined together and surrounded by the first rod, the two second rods and a side of the side rail frame, a distance defined between the two second rods being same as a width of the bottom of the main body;
- wherein the first rod of the assisting assembly is spaced from a back and the top of the vehicle when the each of the two second rods extends out of the side rail frame in a preset extending extent thereof, and is positioned next to the bottom of the main body when the each of the two second rods is entirely received within the side rail frame; and
- wherein a cargo is able to be temporarily loaded in the closed void before being further loaded in the accommodating space of the main body when the first rod of the assisting assembly is positioned and spaced from the back and the top of the vehicle due to extension of the two second rods.

11. The load-assisting cargo bracket for vehicles as claimed in claim 10, wherein the main body comprises a first bracket body and a second bracket body, a plurality of first connection ends are formed at an adjacent side of the first bracket body to the second bracket body, a plurality of second connection ends are formed at an adjacent side of the second bracket body to the first bracket body, the first bracket body is connected with the second bracket body to form the main body via fixed engagement between each of the plurality of first connection ends and a corresponding one of the plurality of second connection ends.

12. The load-assisting cargo bracket for vehicles as claimed in claim 11, wherein the bottom of the main body comprises a bottom formed in the first bracket body and a bottom formed in the second bracket body, the other end of the each of the two second rods is received within a corresponding branch rail of the side rail frame and movable therein, the corresponding branch rail of the side rail frame extends along one of two opposite sides of the bottom of the first bracket body and one of the two opposite sides of the bottom of the second bracket body, respectively.

13. The load-assisting cargo bracket for vehicles as claimed in claim 12, wherein a third connection end is formed at a distal end of the corresponding branch rail of the side rail frame, a fastener is disposed at the third connection end, and is used to fix the each of the two second rods to the corresponding branch rail of the side rail frame.

14. The load-assisting cargo bracket for vehicles as claimed in claim 13, wherein a fixing piece is used to fix the fastener to the third connection end.

15. The load-assisting cargo bracket for vehicles as claimed in claim 14, wherein a blocker is formed at a distal end of the each of two second rods away from the first rod, an outer surface diameter of the blocker is larger than an inner surface diameter of the fixing piece so that the each of two second rods is blocked by the fixing piece when the each of two second rods moves to extend out of the corresponding branch rail of the side rail frame.

16. The load-assisting cargo bracket for vehicles as claimed in claim 10, wherein the assisting assembly comprises two corner pieces, each of the two corner pieces is installed at a corresponding end of two opposite ends of the first rod, and is used to connect to a corresponding one of the two second rods.

17. The load-assisting cargo bracket for vehicles as claimed in claim 10, wherein the assisting assembly comprises at least two rolling parts, the first rod is inserted through each of the at least two rolling parts so that the each of the at least two rolling parts is able to roll around the first rod to provide convenience of loading the cargo.

18. The load-assisting cargo bracket for vehicles as claimed in claim 10, wherein the bottom of the main body comprises a plurality of rails, at least one fixing part is disposed at the bottom of the main body to stride on at least two of the plurality of rails so as to fix the main body on the top of the vehicle.

* * * * *